United States Patent
Monti

(10) Patent No.: US 6,805,528 B2
(45) Date of Patent: Oct. 19, 2004

(54) APPARATUS FOR REPLACING REJECTED ARTICLES, IN PARTICULAR BLISTER PACKS, IN A FEEDING LINE OF A PACKAGING MACHINE

(75) Inventor: Giuseppe Monti, Bologna (IT)

(73) Assignee: Marchesini Group S.p.A., Bologna (IT)

( * ) Notice: Subject to any disclaimer, the term of this patent is extended or adjusted under 35 U.S.C. 154(b) by 0 days.

(21) Appl. No.: 10/336,438

(22) Filed: Jan. 3, 2003

(65) Prior Publication Data

US 2003/0138313 A1 Jul. 24, 2003

(30) Foreign Application Priority Data

Jan. 8, 2002 (IT) ..................................... BO2002A0002

(51) Int. Cl.⁷ .............................................. B65G 59/02
(52) U.S. Cl. ............................... 414/797.3; 414/796.7; 414/796.9; 414/797
(58) Field of Search ........................... 414/796.7, 796.8, 414/797, 797.3, 788.9

(56) References Cited

U.S. PATENT DOCUMENTS

| | | | | |
|---|---|---|---|---|
| 3,063,578 A | * | 11/1962 | Millar ...................... | 414/796.7 |
| 3,721,340 A | | 3/1973 | Kruse et al. | |
| 5,433,583 A | * | 7/1995 | Sasou et al. .............. | 414/797.3 |
| 5,549,444 A | * | 8/1996 | Dubuit ..................... | 414/796.7 |
| 5,721,386 A | * | 2/1998 | Marette ..................... | 73/865.8 |
| 5,857,829 A | * | 1/1999 | Achelpohl ................ | 414/797.3 |
| 5,931,635 A | * | 8/1999 | Barthold .................. | 414/797.3 |
| 5,957,654 A | * | 9/1999 | Choi et al. ................. | 414/797 |
| 6,062,807 A | * | 5/2000 | Johnson et al. ........... | 414/795.8 |
| 6,168,151 B1 | * | 1/2001 | Tsuchida .................... | 271/126 |
| 6,241,449 B1 | * | 6/2001 | Krooss ....................... | 414/419 |
| 6,241,458 B1 | | 6/2001 | Berndl | |
| 6,339,910 B1 | * | 1/2002 | Hahnel et al. ................ | 53/258 |
| 6,405,857 B1 | * | 6/2002 | Wu et al. .............. | 198/750.13 |

FOREIGN PATENT DOCUMENTS

| | | |
|---|---|---|
| DE | 196 48 447 A | 5/1998 |
| EP | 0 465 437 A | 1/1992 |
| EP | 0 876 956 A | 11/1998 |
| EP | 0 876 957 A | 11/1998 |
| GB | 2 051 014 A | 1/1981 |

\* cited by examiner

*Primary Examiner*—Douglas Hess
(74) *Attorney, Agent, or Firm*—William J. Sapone; Coleman Sudol Sapone, P.C.

(57) ABSTRACT

An apparatus for replacing rejected articles, in particular blister packs, includes an additional magazine situated beside the feeding line and aimed at receiving and housing, arranged in pile, the articles, which are to be withdrawn when necessary to replace the rejected articles. An elevating member is connected to the additional magazine and controls the stepwise movement of means supporting the pile of articles in step relation with accumulation of the articles inside the additional magazine or with withdrawal of a single article to be fed to the feeding line, from the top of said pile. A transferring device, situated above the additional magazine, is equipped with gripping means, which transfer the group of articles into the additional magazine, in order to form the pile of articles, and which withdraw single articles from the top of the pile in order to replace the rejected articles.

10 Claims, 3 Drawing Sheets

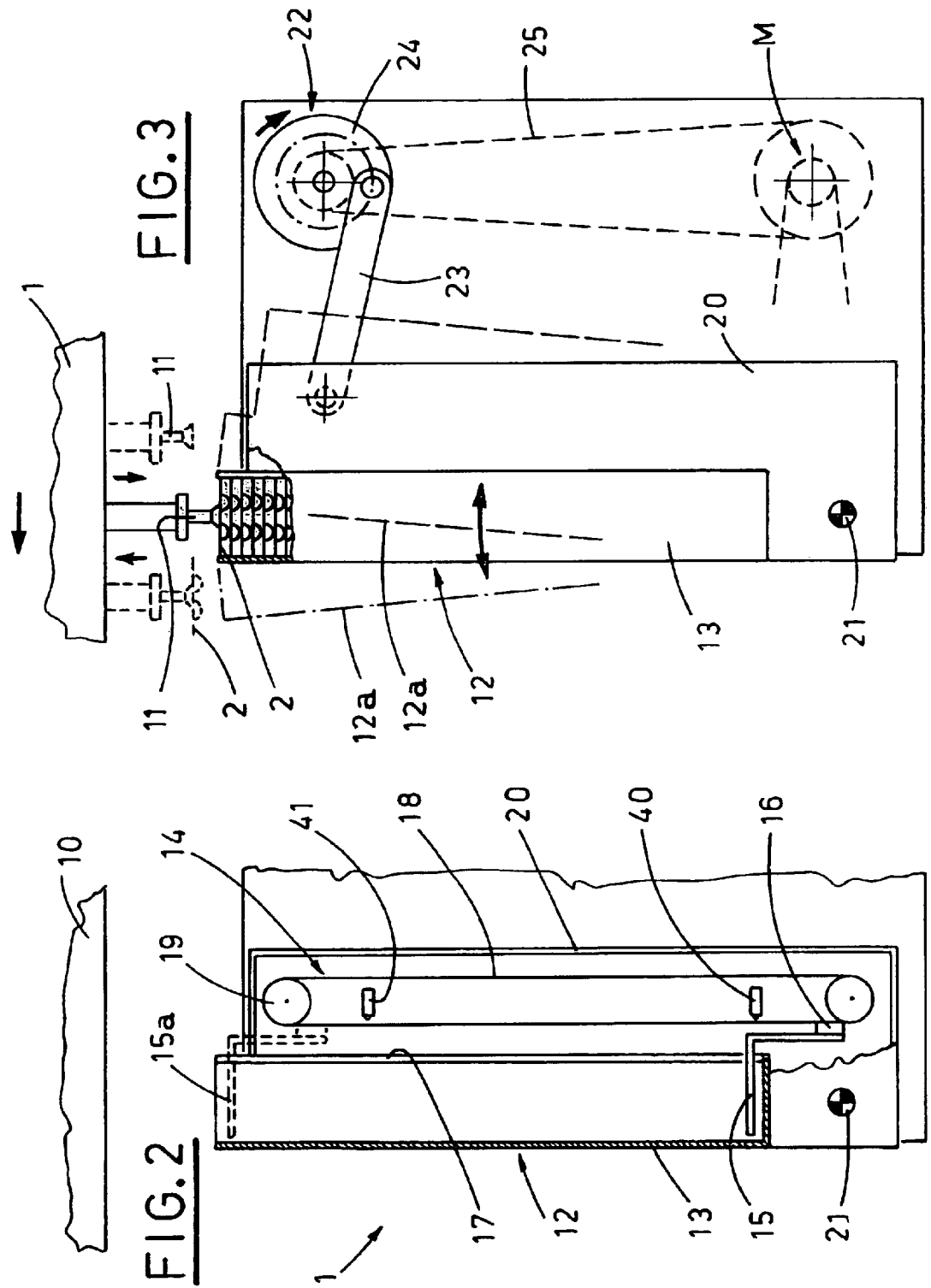

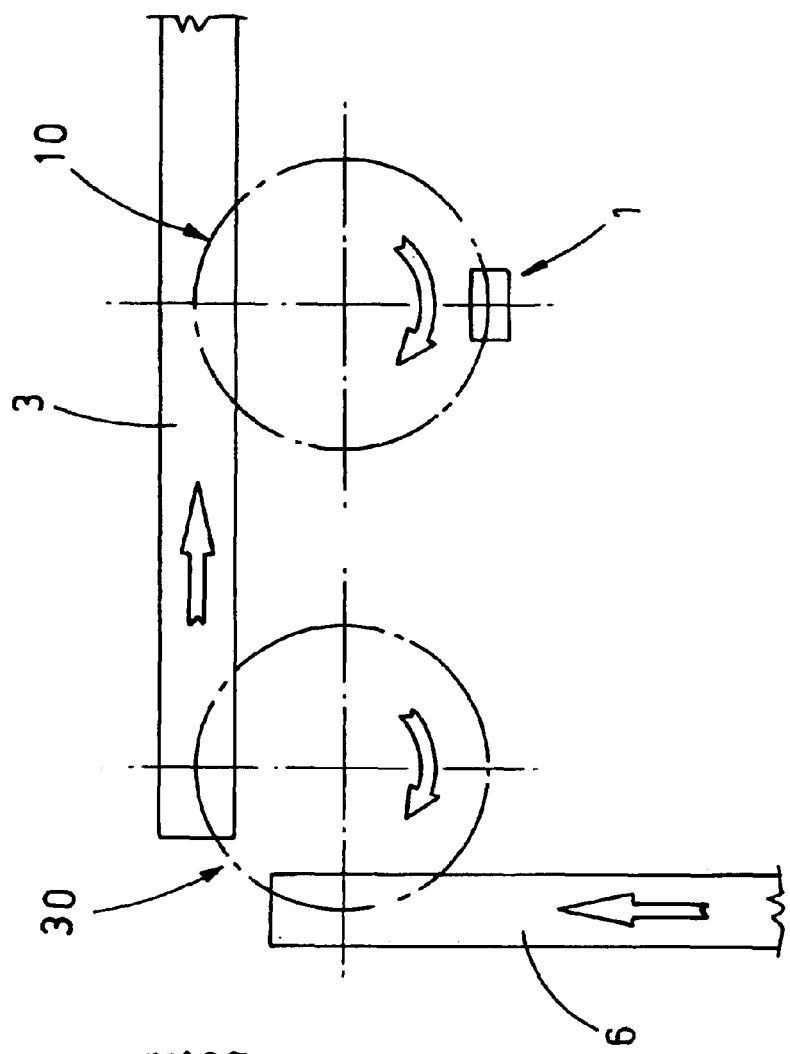
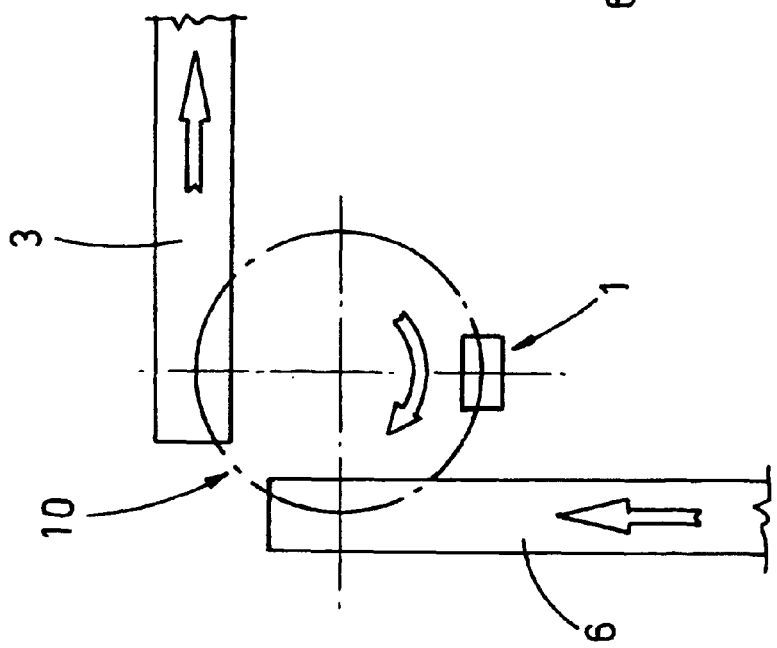

APPARATUS FOR REPLACING REJECTED ARTICLES, IN PARTICULAR BLISTER PACKS, IN A FEEDING LINE OF A PACKAGING MACHINE

FIELD OF THE INVENTION

The present invention relates to feeding articles, such as blister packs and the like, to an automatic machine, specifically to a packaging machine.

More in detail, the invention relates to an apparatus for replacement of rejected articles in the feeding line of a packaging machine.

DESCRIPTION OF THE PRIOR ART

It is known that blister packs, obtained by cutting a band provided with a series of blisters, containing respective products, are transferred from the cutting station of the blistering machine to the feeding line of the packaging machine, which puts the blister packs into suitable boxes.

The blister packs, aligned and regularly spaced apart, are conveyed from the outlet line of the blistering machine to the feeding line of the packaging machine, which are operated continuously.

During transferring of the blister packs to the feeding line of the packaging machine, a printing head, a so-called ink-jet head, usually prints the packages and possible faulty packages are rejected.

Faults can result from e.g. missing or incomplete filling of the blisters or printing errors.

The faulty packages, suitably marked, are removed from the line in a region corresponding to suitable rejection station.

Therefore, in this field there is the problem of replacing the rejected blister packs, so as to fill the empty spaces left by the rejected blister packs in the ordered line, which moves forward to the feeding line of the packaging machine, in order to avoid incomplete filling of the boxes.

The above mentioned problem is solved by the use of replacement devices, which basically substantially include an additional magazine situated above the feeding line of the packaging machine, inside which a group of blister packs is kept in pile.

When a replacement is needed, a blister pack is released from the bottom of the magazine of the replacement device onto the feeding line moving therebelow, to the position previously occupied by the rejected blister pack.

The magazine of the replacement device is filled manually, when it is necessary, by the operator assigned to the machine, who introduces a proper number of piled up blister packs.

The above solution in itself is effective and functional, however it does not ensure the correct replacement of the articles to be packaged, because the feeding of the replacement device is assigned to the manual operation of the operator.

If, for instance, due to any possible reason, the operator does not fill the magazine of the replacement device with the correct blister packs to be packaged, when the kind of production is changed, and does not substitute the remaining blister packs of the previous group, some packages could include blister packs different from those expected.

Obviously, an error of this kind would be particularly serious when pharmaceutical products and the like are packaged, for which high safety requirements must be met during use.

Consequently, the presently used replacement devices cannot ensure a correct feeding of the blister packs to the packaging machine, due to possible human errors.

SUMMARY OF THE INVENTION

The object of the present invention is to avoid the above mentioned drawback by proposing an apparatus, which allows automatic replacement of articles such as blister packs, onto the feeding line of the packaging machine, without the necessity for the operator to perform any action during the blister packs loading.

Another object of the present invention is to propose an apparatus, whose structure is very simple as far as construction and operation are concerned, and which is versatile and can be used with different blister packs to be packaged.

The above mentioned objects are obtained, in accordance with the contents of the claims, by an apparatus for replacing rejected articles, in particular blister packs, onto the feeding line of a packaging machine, along which the articles to be packaged are conveyed arranged aligned in a line and regularly spaced apart, including:

an additional magazine situated beside the feeding line for receiving and housing, arranged in a pile, a series of said articles, which are destined to be picked up when necessary to replace the rejected articles;

an elevating member connected to said additional magazine and aimed at controlling the stepwise movement of the means supporting said articles arranged in a pile in suitable step relation with accumulation of the articles inside said additional magazine or with removal of a single article to be fed to said feeding line, from the top of said pile;

a transferring device, situated above said additional magazine and equipped with gripping means, which automatically transfer said series of said articles into said additional magazine, in order to form a pile of said articles, and which pick up single articles from top of said pile in order to replace the rejected articles.

BRIEF DESCRIPTION OF THE DRAWINGS

The characteristic features of the present invention will be pointed out in the following, with reference to the enclosed drawings, in which:

FIG. 2 is a vertical section view of the replacement apparatus;

FIG. 3 is a corresponding lateral view, during transferring of an article to be placed onto the feeding line;

FIGS. 4 and 5 are schematic views of the arrangement of the replacement apparatus with respect to the feeding line, according to two different embodiments.

DESCRIPTION OF THE PREFERRED EMBODIMENT

Figure 1:
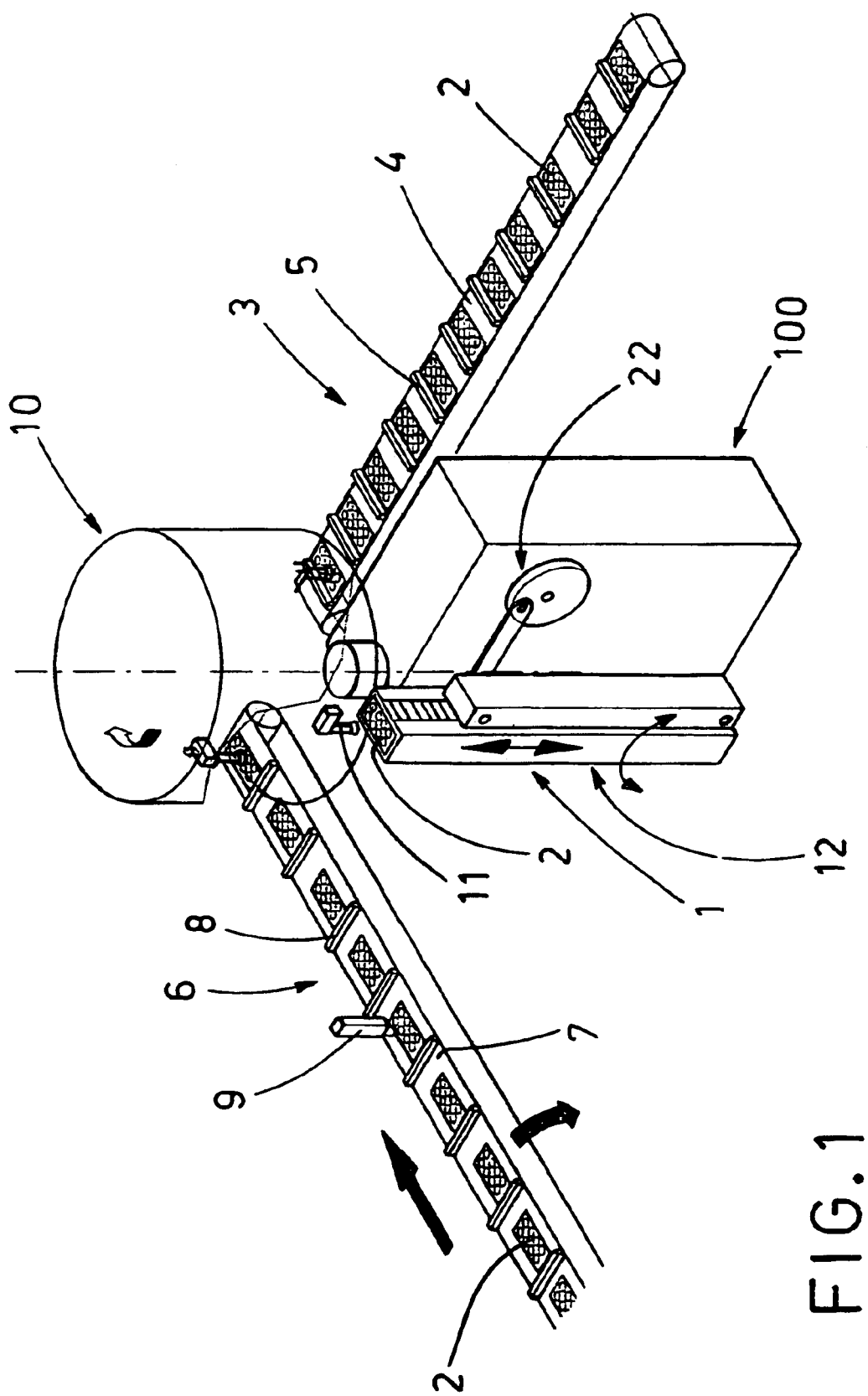
FIG. 1 is a schematic perspective view of a line for feeding blister packs to the packaging machine equipped with the proposed replacement apparatus.

With reference to the above mentioned figures, the reference numeral 1 indicates the apparatus, which replaces the rejected blister packs 2 onto the feeding line 3 of the packaging machine, which is not shown.

The feeding line 3 includes, according to known techniques, belt conveying means 4 operated in a continuous motion and equipped with suitable transversal crosspieces 5, regularly spaced apart and defining therebetween respective spaces for receiving blister packs 2 to be fed to the packaging machine.

The blister packs 2 are then transferred to the feeding line 3 in a region corresponding to the terminal part of an outlet line 6 of the cutting station of the blistering machine, not shown.

The outlet line 6 includes belt conveying means 7 operated in a continuous motion and equipped with suitable transversal crossbars 8, regularly spaced apart and defining therebetween respective spaces for receiving blister packs 2 to be fed to the feeding line 3.

A printing head 9, e.g. a so-called ink-jet head, is situated, if required, along the outlet line 6.

In the case shown as an example in FIG. 1, the feeding line 3 of the packaging machine is arranged perpendicular to the outlet line 6 of the blistering machine, on the same horizontal plane.

The transferring of the blister packs 2 from the outlet line 6 to the feeding line 3 is performed by a carrousel 10 rotating on a vertical axis.

The transferring carrousel 10 features, situated along its edge, a plurality of gripping means 11, e.g. suction cups, connected with suitable suction means.

The gripping means 11 suitably rotate on a respective vertical axis, so as to make the blister packs 2 counter-rotate, during their transferring from the outlet line 6 to the feeding line 3, in order to maintain unchanged their orientation.

Moreover, the gripping means 11 are operated, by suitable actuator means, to move vertically to withdraw and release the blister packs 2.

The replacement apparatus 1 includes an additional magazine 12, which receives and houses a plurality of piled up blister packs 2, which are aimed at being withdrawn, when needed, to replace the rejected articles.

As shown in FIG. 1, the additional magazine 12 is situated beside the outlet line 6 of the blistering machine, below the carrousel 10.

The additional magazine is in fact situated below the area with the gripping means 11 of the transferring carrousel 10.

The additional magazine 12 includes a vertical container 13, with a mobile tray 15 of an elevating member 14 situated thereinside, which supports the pile of blister packs 2 housed inside the additional magazine 12.

The support tray 15 passes through an opening 17 made longitudinally in a surface of the container 13 and is fastened, by means of a connection element 16, to a flexible transmission member 18, e.g. toothed belt, aimed at being operated in stepwise motion, in opposite directions, by a motor, not shown.

The transmission member 18 is trained around a pair of pulleys 19, rotatably supported inside a casing 20, integral with the container 13 of the additional magazine 12.

The additional magazine 12 is hinged to the base of the structure supporting the carrousel 10, by a pin 21, for example, but not necessarily, with horizontal axis, perpendicular to the feeding line 3, as shown in FIGS. 1, 4 and 5.

In particular, the additional magazine 12 is made to perform an oscillation for each of the gripping means of the carrousel 10.

The additional magazine 12 is operated to oscillate by a linkage 22 formed by a connecting rod 23 and a crank 24.

The linkage 22 is operated, by means of a transmission member 25, by a motor M of the transferring carrousel, so that the additional magazine 12 oscillates in suitable step relation with the rotation of the carrousel 10.

The additional magazine 12 is equipped with two sensors 40, 41, first and second, which detect respectively the maximum and minimum level of the blister packs 2 inside the magazine.

FIG. 1 shows an electric-electronic apparatus, indicated generally with the reference numeral 100, which incorporates the motor M, the means operating the elevating member 14, means for activating and deactivating gripping means 11 and the sensors 40, 41.

The apparatus 100 is operatively connected with the functional logic of the packaging machine with regard to filling of the boxes with the blister packs, as well as to the information related to counting the blister packs carried by the feeding line 3 and aimed at being introduced into the boxes in predetermined quantities.

The means and procedures for counting blister packs are not indicated, since they are known to those skilled in the field.

It is to be pointed out that the functional logic of the packaging machine controlling the operation of the apparatus 100 has stored therein the number of the blister packs 2 which are present on the feeding line 3 from the release point of the device 10 up to the picking up point (which is not shown).

The operation of the proposed apparatus for replacing the blister packs 2 onto the feeding line 3 of the packaging machine includes basically picking up e.g. at the beginning of each working cycle, a group of blister packs 2 going forward along the outlet line 6 of the blistering machine and transferring them, arranged in a pile, into the additional magazine 12.

The transferring is carried out by the gripping means 11 of the carrousel 10, which rotates in the same direction of the blister packs 2 movement along the outlet line 6 of the blistering machine.

During rotation of the carrousel 10, the gripping means 11 move vertically and alternately, between a lowered position, in which the blister packs 2 are picked up and released, and a raised, transport position.

So, while filling the additional magazine 12, all the gripping means 11 lower cyclically in order to pick up blister packs 2 from the outlet line 6, then they raise with the blister packs 2 just picked up in order to transport them in a region corresponding to the additional magazine 12 and then lower again in order to release the blister packs 2 into the additional magazine 12.

The blister packs 2 in pile are released onto the support tray 15, which lowers gradually beginning from a position 15a, located at top of the additional magazine 12 (see FIG. 2).

It is to be pointed out that during releasing of the blister packs 2, the additional magazine 12, operated by the linkage 22 to oscillate on its pin 21, moves in the same direction as the rotation direction of the carrousel 10.

Therefore, the additional magazine 12 follows the movement of the gripping means 11, carried by the carrousel 10, so as to substantially compensate for any relative speed of one with respect to the other during the release of the blister packs 2.

After the blister packs 2 have been loaded into the additional magazine 12, the carrousel 10 works in normal operation conditions of the machine picking up blister packs 2 from the outlet line 6 and transferring the blister packs 2 to the feeding line 3 of the packaging machine, situated perpendicular to the other one.

The rotation of the gripping means 11, in the direction opposite to the rotation direction of the carrousel 10, which covers an angle of 90°, determines, during the transferring step, a suitable counter-rotation of the blister packs 2, which allows the original orientation of the blister packs 2 on the feeding line 3 to be kept unchanged.

In case a faulty blister pack is rejected along the outlet line 6 of the blistering machine, due to intervention of suitable fault detection means, the apparatus provides a new blister pack 3 onto the feeding line 3 in the empty position, taking automatically the blister pack 2 from the additional magazine 12.

For this purpose, a relative gripping member of the carrousel 10 picks up the blister pack 2 situated on top of the pile housed inside the additional magazine 12, in a way analogous to the additional magazine 12 filling step (see FIG. 3).

In particular, the additional magazine 12, operated by the linkage 22 to oscillate on its pin 21, moves also during this picking up step in the same direction as the rotation direction of the carrousel 10.

Thus, the additional magazine 12 follows the movement of the gripping means 11, so as to substantially avoid any relative speed of one with respect to the other during the release of the blister packs 2.

It is to be pointed out that due to the prevailing longitudinal dimension of the additional magazine 12 and the limitation of the oscillation arc, indicated with broken lines 12a, the blister pack 2 to be picked up moves, during the pick up step, on a substantially straight path.

Thus, the gripping member 11 raises with the picked up blister pack 2 to transport it to a region corresponding to the feeding line 3 and then it lowers again to release the blister pack 2 into the empty space of the feeding line 3.

Obviously, at the end of the pick up step of the blister pack 2 from the additional magazine 12, the support tray 15 raises by one step in order to prepare a next blister pack 2, situated at the top of the pile, to the position, in which it can be picked up by the gripping means 11 of the carrousel 10.

The sensors 40, 41 allow the automatic filling of the additional magazine 12 also during the normal packaging process.

When the second sensor 41 detects the minimum level of the blister packs 2 in the additional magazine 12, the filling procedure for the magazine is started again, in accordance with the functional logic control unit of the packaging machine.

This filling procedure is started only after a number of blister packs 2 to be packaged in the boxes has been counted on the feeding line 3, which allows to complete filling of the boxes i.e. a number which is a multiple of the number of blisters of each single box. Then, the blister transfer to the feeding line 3, is suspended.

During the time which passes from the signal issued by the second sensor 41 and the activation of the magazine filling procedure, the blister packs 2 coming from the outlet line 6 are in fact still transferred to the feeding line 3.

As soon as the first sensor 40 detects the maximum level, of the blister packs 2 in the additional magazine 12, the procedure of filling the feeding line 3 is resumed, in accordance with the functional logic control unit of the packaging machine.

This filling procedure is started only after that no blister packs 2 to be packaged into a box are still present on the feeding line 3.

During the time which passes from the signal issued by the first sensor 40 and the activation of the procedure of normal operation of the feeding line 3, the blister packs 2 coming from the outlet line 6 are fed to the magazine 12.

Consequently, the proposed apparatus fulfills the object of automatic integration of the blister packs 2 to the feeding line 3 of a packaging machine, without involving the operator assigned to the machine in any operation step.

In fact, the object of the apparatus according to the present invention is to fill the additional magazine 12, e.g. at the beginning of the packaging cycle of a group of a predetermined type of articles, using the articles arriving from the outlet line of the blistering machine.

Moreover, at the end of the packaging cycle, the apparatus empties automatically the additional magazine 12 form the remaining blister packs 2, according to a procedure inverse to the filling one.

Actually, the blister packs 2 are picked up one after one from the top of the additional magazine 12 by relative gripping means 11 and released onto the feeding line 3, after the last blister packs 2 transferred from the outlet line 6.

Consequently, the described solution ensures maximum security during packaging of the blister packs and similar articles, since the possibility of a human error is excluded.

Another advantage of the present invention lies in a wide versatility in use of the described apparatus.

In particular, the apparatus allows to change blister size in a simple and rapid way, since it is enough to substitute the container 13 and the support tray 15 of the additional. magazine 12, which are fit for one blister pack size, while it is not necessary to substitute the means 11 for gripping and transferring the blister packs.

According to the described solution, the additional magazine 12 is filled and the blister packs 2 are placed onto the feeding line 3 by the carrousel 10, which is also used to transfer the blister packs 2 to the outlet line 6 in normal operation conditions.

In this case, the replacement apparatus must be situated in a region corresponding to the inlet area of the feeding line 3, at the end of the outlet line 6 of the blistering machine, as shown schematically in FIG. 4.

However, the proposed replacement apparatus can be situated in any position beside the feeding line 3, as shown in FIG. 5.

In this case, the carrousel 10 of the apparatus is used only for filling the additional magazine 12 situated below and integration of the rejected blister packs, according to what has been described previously, while in normal operation conditions, the blister packs 2 are transferred from the outlet line 6 of the blistering machine to the feeding line 3 of the packaging line by an additional carrousel 30, rotating likewise on a vertical axis and equipped with corresponding gripping means, situated along its edge.

Obviously, the feeding line 3 can be situated in alignment with the outlet line 6 of the blistering machine, and not perpendicular thereto.

As in the previous case, in this configuration, the replacement apparatus can be situated in any position beside the feeding line 3 and the relative carrousel 10 is used only for filling the additional magazine 12 situated below and integration of the rejected blister packs.

What is claimed is:

1. An apparatus for replacing rejected articles, in particular blister packs, onto the feeding line of a packaging machine, along which the articles to be packaged are conveyed, arranged and aligned in a line and regularly spaced apart, including:

an additional magazine situated beside the feeding line for receiving and housing, a series of said articles arranged in a pile, which are used to replace the rejected articles;

an elevating member connected to said additional magazine for controlling a stepwise movement of means supporting said articles arranged in a pile in step relation with an accumulation of the articles inside said additional magazine or with removal of a single article to be fed to said feeding line, from a top of said pile;

a transferring device, situated above said additional magazine and equipped with gripping means, for automatically transferring said series of said articles into said additional magazine, to form a pile of said articles, and for picking up single articles from a top of said pile for replacing the rejected articles.

2. An apparatus according to claim 1, wherein said transferring device is a carrousel, rotating on a vertical axis in the same direction as the forward movement direction of said feeding line, and equipped with said gripping means situated along its edge.

3. An apparatus according to claim 2, wherein said carrousel, in normal operation conditions, picks up one by one said articles from an outlet line and transfers orderly said picked up articles to said feeding line, which is situated perpendicular to said feeding line.

4. An apparatus according to claim 1, further including means for controlling the movement of said additional magazine in the same direction as the forward movement direction of said transferring device, in suitable step relation, respectively with the transferring device, in suitable step relation, respectively with the transferring of said articles piled up inside said additional magazine and with removal of single articles from the top of said pile in order to replace said rejected articles.

5. An apparatus according to claim 4, wherein said controlling means are designed to move said additional magazine with such a speed that the transferring and removal of said articles by said gripping means in performed at substantially zero speed.

6. An apparatus according to claim 4, wherein said additional magazine is hinged to the base of a stationary structure of the machine, at a pivot pin, and is operated to oscillate by a linkage controlled, by means of a transmission member, by a motor member of said transferring device.

7. An apparatus according to claim 1, wherein said means supporting said pile of articles include a tray fastened to a transmission member, which is operated in stepwise motion, in opposite direction, longitudinally with respect to said additional magazine.

8. An apparatus according to claim 1, wherein said gripping means move vertically, controlled by suitable actuator means, in order to pick up and release said articles.

9. An apparatus according to claim 1, wherein said additional magazine includes a vertical container, made with different sizes and interchangeable.

10. An apparatus according to claim 1, including: an electric-electronic apparatus for controlling and operating said transferring device, the relative gripping means, and said elevating member, said apparatus being aimed at receiving, from a functional logic control unit of said packaging machine, information concerning a filling of the boxes with blister packs, as well as information concerning the number of the blister packs carried by the feeding line as well as the number of blister packs which are to be introduced into each of said boxes;

a first and second sensors, which detect respectively the maximum and minimum level of the blister packs inside said magazine, and which are connected to the functional logic control unit of the packaging machine, with the second sensor aimed at activating, after having detected said minimum level, the filling of the magazine only when a number of said blister packs have been countered over said feed line, said number being a multiple of the number of blister packs for each box, and, consequently, the blister transfer to said feeding line downstream of said magazine is suspended;

with said first sensor aimed at resuming, after having detected said maximum level, the normal feeding of blister packs to said feeding line, downstream of said magazine, only when there are no more blister packs on said feeding line.

* * * * *